US 9,338,178 B2

(12) United States Patent
Yang et al.

(10) Patent No.: US 9,338,178 B2
(45) Date of Patent: May 10, 2016

(54) METHOD AND SYSTEM FOR PERFORMING SCANNING AND KILLING ON BROWSER BOOKMARKS

(71) Applicant: TENCENT TECHNOLOGY (SHEN ZHEN) COMPANY LIMITED, Guangdong (CN)

(72) Inventors: Bo Yang, Guangdong (CN); Xiaodan Lin, Guangdong (CN)

(73) Assignee: Tencent Technology (Shen-Zhen) Company Limited, Shenzhen, Gaungdong (CN)

( * ) Notice: Subject to any disclaimer, the term of this patent is extended or adjusted under 35 U.S.C. 154(b) by 0 days.

(21) Appl. No.: 14/135,059

(22) Filed: Dec. 19, 2013

(65) Prior Publication Data
US 2014/0109222 A1    Apr. 17, 2014

Related U.S. Application Data

(63) Continuation of application No. PCT/CN2013/078854, filed on Jul. 5, 2013.

(30) Foreign Application Priority Data

Jul. 6, 2012 (CN) .......................... 2012 1 0232763

(51) Int. Cl.
G06F 21/56 (2013.01)
H04L 29/06 (2006.01)
H04L 29/08 (2006.01)

(52) U.S. Cl.
CPC ............ *H04L 63/1416* (2013.01); *G06F 21/56* (2013.01); *H04L 63/1425* (2013.01); *H04L 67/02* (2013.01)

(58) Field of Classification Search
CPC ........................... G06F 21/56; G06F 17/30884
See application file for complete search history.

(56) References Cited

U.S. PATENT DOCUMENTS

2008/0010286 A1* 1/2008 Zhang et al. ..................... 707/10
2008/0301222 A1* 12/2008 Schneider ..................... 709/203
(Continued)

FOREIGN PATENT DOCUMENTS

CN    101080056    11/2007
CN    101739412    6/2010
(Continued)

OTHER PUBLICATIONS

Jokobsson, "The Human Factor in Phishing", 2007, 19 pages.*
(Continued)

*Primary Examiner* — Taghi Arani
*Assistant Examiner* — Thaddeus Plecha
(74) *Attorney, Agent, or Firm* — Foley & Lardner LLP

(57) ABSTRACT

The present invention discloses a method and a system for performing scanning and killing on browser bookmarks, the method comprising: receiving, by a browser background server, a synchronization request that includes a user account and bookmark web addresses from a browser client; storing, by the browser background server, the bookmark web addresses correspondingly to the user account; and receiving a cloud scanning and killing instruction that includes the user account from the browser client, performing risk scanning and killing on the bookmark web addresses which the user account corresponds to, determining a risky web address, and feeding back a scanning and killing result that includes the risky web address to the browser client, by the browser background server. The solutions of the present invention can improve security of the browser bookmarks, and save storage spaces of a terminal device where the browser client resides.

18 Claims, 3 Drawing Sheets

(56) References Cited

U.S. PATENT DOCUMENTS

| | | | | |
|---|---|---|---|---|
| 2011/0119626 A1* | 5/2011 | Faenger | ............... | 715/811 |
| 2011/0167492 A1* | 7/2011 | Ghosh et al. | ............... | 726/23 |
| 2012/0036580 A1* | 2/2012 | Gorny et al. | ............... | 726/25 |
| 2012/0158626 A1* | 6/2012 | Zhu et al. | ............... | 706/13 |

FOREIGN PATENT DOCUMENTS

| | | |
|---|---|---|
| CN | 101969636 | 2/2011 |
| CN | 102467633 | 5/2012 |
| WO | WO2014/005542 A1 | 1/2014 |

OTHER PUBLICATIONS

Written Opinion of the International Searching Authority for PCTCN2013/078854, dated Oct. 17, 2013, 6 pages.

International Search Report for PCTCN2013/078854, dated Oct. 17, 2013, 2 pages.

Chinese Office action for Application No. 201210232763X with statement of relevance, mailed on Feb. 27, 2015, 7 pages.

Second Chinese Office Action for Application No. 201210232763.X with statement of relevance, mailed Jul. 1, 2015, 5 pages.

* cited by examiner

METHOD AND SYSTEM FOR PERFORMING SCANNING AND KILLING ON BROWSER BOOKMARKS

RELATED APPLICATIONS

This is a continuation of International Application PCT/CN2013/078854, with an international filing date of Jul. 5, 2013, now pending, which itself claims priority to CN201210232763.X filed Jul. 6, 2012. The contents of which are incorporated herein by reference.

FIELD OF THE PRESENT INVENTION

The present disclosure relates to a virus scanning and killing technique, and particularly, to a method and a system for performing scanning and killing on browser bookmarks.

BACKGROUND OF THE PRESENT INVENTION

Bookmarks in a browser, i.e., Favorites or My Favorites in the browser, are used to save web addresses, so that a user can quickly save the web addresses without using a pen and a piece of paper to write the web addresses or keeping the web addresses in mind, and can be rapidly linked to the web addresses. Many PC browser clients and mobile device browser clients have a bookmark function, and such browser clients include, for example, Internet Explorer, Firefox, Opera, Safari, Google Chrome, and the like.

Here, the web addresses included in the bookmarks are called bookmark web addresses, and since the bookmark web addresses are used frequently, it is necessary to perform scanning and killing, such as virus scanning and killing, on the bookmark web addresses in order to ensure security of the bookmark web addresses. Currently, methods for performing the scanning and killing on browser bookmarks includes that a browser client downloads a list of risky web addresses from a browser background server at a network side in advance, performs the risk scanning and killing if necessary, and if a bookmark web address is included in the list of risky web addresses, determines it as a risky web address.

Existing solutions for performing the scanning and killing on the browser bookmarks are mainly completed by the browser client, which performs the risk scanning and killing based on the list of risky web addresses downloaded in advance. However, in practical applications, the list of risky web addresses is updated frequently, and the existing solutions can not ensure that the list of risky web addresses used for the risk scanning and killing is the latest, which renders a low security of the bookmark web addresses, and moreover, a capacity of the list of risky web addresses becomes larger and larger, which renders that the list occupies more and more storage spaces of a terminal device.

SUMMARY OF THE PRESENT INVENTION

The present disclosure provides a method for performing scanning and killing on browser bookmarks, which can improve security of the browser bookmarks, and save storage spaces of a terminal device where a browser client resides.

The present disclosure provides a system for performing scanning and killing on browser bookmarks, which can improve security of the browser bookmarks, and save storage spaces of a terminal device where a browser client resides.

According to an aspect of the disclosure, there is provided a method for performing scanning and killing on browser bookmarks, the method comprising:

receiving, by a browser background server, a synchronization request that includes a user account and bookmark web addresses from a browser client;

storing, by the browser background server, the bookmark web addresses correspondingly to the user account; and receiving a cloud scanning and killing instruction that includes the user account from the browser client, performing risk scanning and killing on the bookmark web addresses which the user account corresponds to, determining a risky web address, and feeding back a scanning and killing result that includes the risky web address to the browser client, by the browser background server.

According to another aspect of the disclosure, there is provided a system for performing scanning and killing on browser bookmarks, the system comprising a browser client and a browser background server;

the browser client being used for sending a synchronization request that includes a user account and bookmark web addresses to the browser background server, and receiving a scanning and killing result that includes a risky web address from the browser background server; and the browser background server being used for receiving the synchronization request from the browser client, storing the bookmark web addresses correspondingly to the user account, receiving a cloud scanning and killing instruction that includes the user account from the browser client, performing risk scanning and killing on the bookmark web addresses which the user account corresponds to, determining the risky web address, and feeding back the scanning and killing result that includes the risky web address to the browser client.

As can be seen from the above solutions, the present disclosure performs risk scanning and killing on the browser bookmark web addresses in the browser background server at the network side, and since the list of risky web addresses stored in the browser background server is the latest, the security of the browser bookmarks is improved; moreover, by performing the risk scanning and killing in the browser background server, the browser client does not need to download and save the list of risky web addresses, which saves the storage spaces of the terminal device where the browser client resides.

DETAILED DESCRIPTION OF THE PRESENT INVENTION

The present disclosure is described in further detail below with reference to embodiments thereof and the accompanying drawings, so as to make the objects, technical solutions, and advantages of the present disclosure more apparent.

Figure 1:
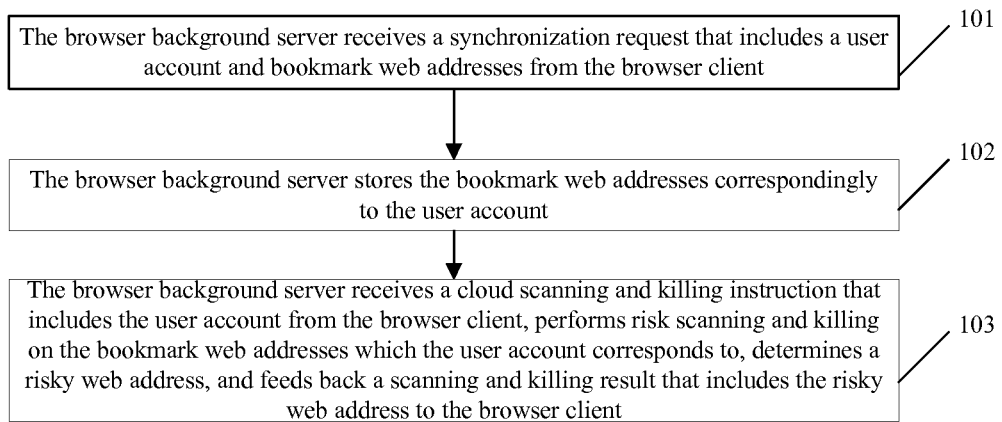
FIG. 1 is a schematic flowchart of a method for performing scanning and killing on browser bookmarks according to an embodiment of the present disclosure.

In the embodiment of the present disclosure, bookmark web addresses of a browser are synchronized to a browser background server at a network side, and risk scanning and killing is performed by the browser background server on the bookmark web addresses. Referring to FIG. 1, which is a schematic flowchart of a method for performing scanning and killing on browser bookmarks according to an embodiment of the present disclosure, the method comprises the following steps.

Step 101, the browser background server receives a synchronization request that may include a user account and bookmark web addresses from the browser client.

The browser client is opened, and a user may log in by using the user account and a password; then, the user may select a bookmark synchronization function, and the browser client sends the synchronization request to the browser client background server. For example, for a QQ browser client, the user may log in by using a QQ number and a password, and after the user selects the bookmark synchronization function, a synchronization request that includes the QQ number and the bookmark web addresses is sent to the browser background server.

Step 102, the browser background server stores the bookmark web addresses correspondingly to the user account.

Step 103, the browser background server receives a cloud scanning and killing instruction that includes the user account from the browser client, performs risk scanning and killing on the bookmark web addresses which the user account corresponds to, determines a risky web address, and feeds back a scanning and killing result that includes the risky web address to the browser client.

The step of performing the risk scanning and killing on the bookmark web addresses may specifically include: judging whether at least one of the bookmark web addresses is included in the list of risky web addresses, and if so, the bookmark web address is determined as the risky web address. The list of risky web addresses includes a black list or includes both the black list and a list of unknown web addresses, where the black list includes a list of web addresses which are certainly risky, and the list of unknown web addresses includes a list of web addresses which may possibly be risky.

Furthermore, the step that the browser background server performs the risk scanning and killing on the bookmark web addresses may specifically include that the browser background server judges whether at least one of the bookmark web addresses is included in a white list, and if so, the bookmark web address is determined as a safe web address. Accordingly, after the browser background server performs the risk scanning and killing on the bookmark web addresses, the method may further comprise that the browser background server feeds back prompt information including the safe web address to the browser client, and the browser client displays the prompt information. The white list includes a list of safe web addresses.

The browser client may receive a scanning and killing result that includes the risky web address, and then may delete the risky web address from the bookmarks. In order to ensure that the bookmark web addresses stored by the browser client and those stored by the browser background server are the same, the browser client may, after deleting the bookmark web address, feed back a response message that includes the user identification and the deleted web address to the browser background server, and the browser background server may query the bookmark web addresses that correspond to the user identification, and delete the web address included in the response message from the queried bookmark web addresses. The user identification may be the user account described above.

Moreover, in order to further ensure that the bookmark web addresses stored by the browser client and those stored by the browser background server are the same, when the browser client adds a bookmark web address, it may further send a synchronization addition request that includes the user account and the bookmark web address to the browser background server, and the browser background server may store the bookmark web address included in the synchronization addition request correspondingly to the user account, performs the risk scanning and killing on the bookmark web address, determines a risky web address, and feeds back a scanning and killing result that includes the risky web address to the browser client.

Figure 2:
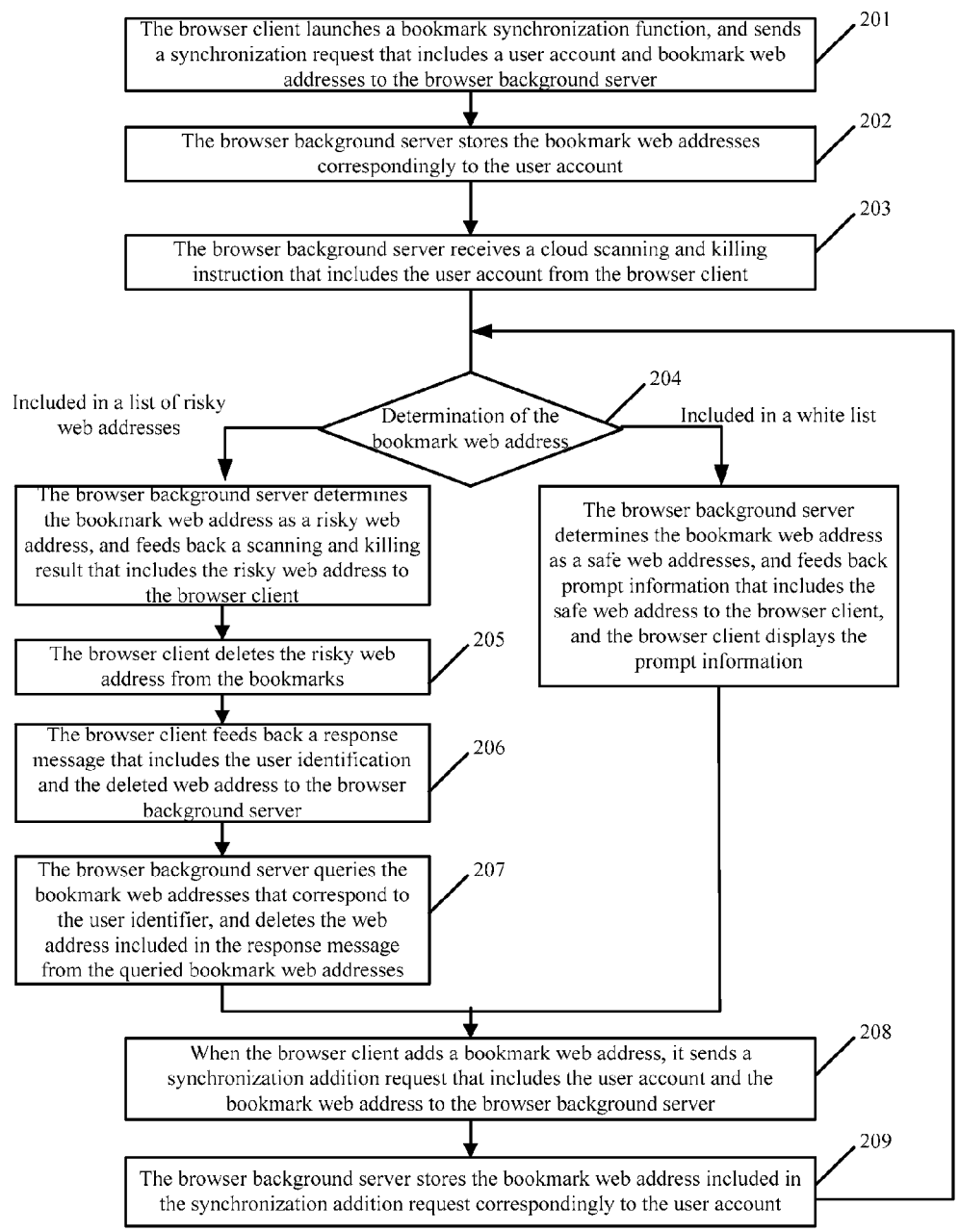
FIG. 2 is a flowchart example of a method for performing scanning and killing on browser bookmarks according to an embodiment of the present disclosure.

Referring to FIG. 2, which is a flowchart example of a method for performing scanning and killing on browser bookmarks according to an embodiment of the present disclosure, the method comprises the following steps.

Step 201, the browser client launches a bookmark synchronization function, and sends a synchronization request that may include a user account and bookmark web addresses to the browser background server.

The browser client is opened, and a user may log in by using the user account and a password; then, the user may select the bookmark synchronization function, so that the browser client sends the synchronization request to the browser client background server.

The bookmark synchronization function may be added onto the browser client, and a bookmark synchronization function option may be set. After the user selects this option, the browser client launches the bookmark synchronization function. Specifically, the bookmark web addresses are, for example, bookmark Uniform Resource Locator (URL) addresses.

Step 202, the browser background server stores the bookmark web addresses correspondingly to the user account.

Step 203, the browser background server receives a cloud scanning and killing instruction that includes the user account from the browser client.

A cloud scanning and killing function may be added onto the browser client, and a cloud scanning and killing function option may be set. After the user selects this option, the browser client launches the cloud scanning and killing function, and sends the cloud scanning and killing instruction to the browser background server.

Step 204, the browser background server performs risk scanning and killing on the bookmark web addresses which the user account corresponds to, and judges whether at least one of the bookmark web addresses is included in the list of risky web addresses or in the white list. If the bookmark web address is included in the list of risky web addresses, the browser background server determines it as a risky web address, feeds back a scanning and killing result that includes the risky web address to the browser client, and performs step 205, whereas if the bookmark web address is included in the white list, the browser background server determined it as a safe web address and feeds back prompt information that includes the safe web address to the browser client, and the browser client displays the prompt information and performs step 208.

The list of risky web addresses includes a black list or includes both the black list and a list of unknown web addresses. If the list of risky web addresses includes both the black list and the list of unknown web addresses, the browser background server may indicate in the scanning and killing result whether the risky web address is included in the black list or in the list of unknown web addresses when it feeds back the scanning and killing result to the browser client.

Step 205, the browser client may delete the risky web address from the bookmarks.

After receiving the scanning and killing result that includes the risky web address, which is fed back from the browser background server, the browser client may delete the risky web address directly. Alternatively, the user may decide whether to delete or retain the risky web address, and in such a case, after the browser client receives the scanning and killing result, it presents the risky web address to the user, and the user selects whether to delete or retain the risky web address; if the user selects to delete the risky web address, the browser client deletes it from the bookmarks, whereas if the user selects to retain the risky web address, it is not deleted.

Step 206, the browser client may feed back a response message that includes the user identification and the deleted web address to the browser background server. The user identification may be the user account described above.

Step 207, the browser background server may query bookmark web addresses that correspond to the user identification, and delete the web address included in the response message from the queried bookmark web addresses.

Step 208, when the browser client adds a bookmark web address, it may send a synchronization addition request that includes the user account and the bookmark web address to the browser background server.

Step 209, the browser background server may store the bookmark web address included in the synchronization addition request correspondingly to the user account, and perform step 204.

In the embodiment of the present disclosure, the risk scanning and killing is performed on the browser bookmark web addresses in the browser background server at the network side, and since the list of risky web addresses stored in the browser background server is the latest, the security of the browser bookmarks is improved; moreover, the bookmark web addresses of the browser client are synchronized to the browser background server which performs the risk scanning and killing, the browser client does not have to update and store the list of risky web addresses continuously, which saves storage spaces of the terminal device where the browser client resides.

Figure 3:
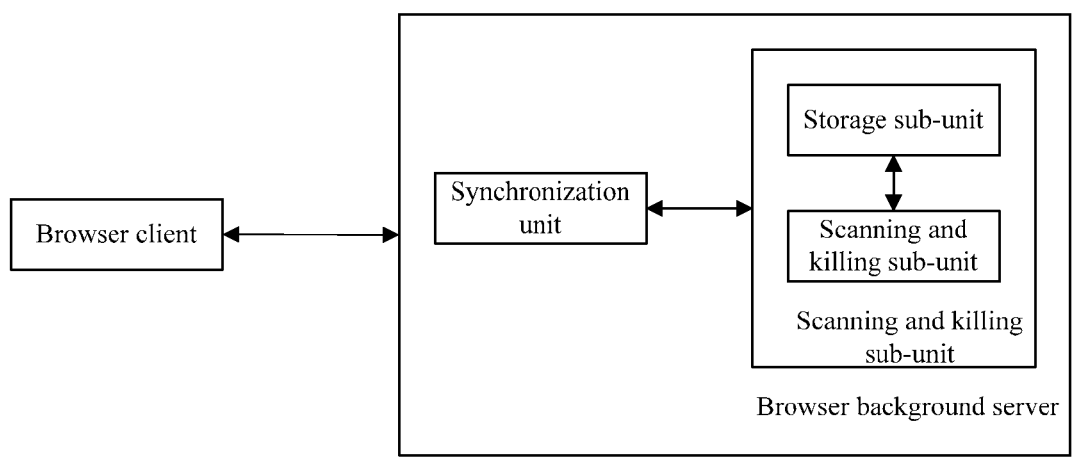
FIG. 3 is a schematic diagram of a structure of a system for performing scanning and killing on browser bookmarks according to an embodiment of the present disclosure.

Referring to FIG. 3, which is a schematic diagram of a structure of a system for performing scanning and killing on browser bookmarks according to an embodiment of the present disclosure, the system comprises a browser client and a browser background server; the browser client is used for sending a synchronization request that may include a user account and bookmark web addresses to the browser background server, and receiving a scanning and killing result that includes a risky web address from the browser background server; and the browser background server is used for receiving the synchronization request from the browser client, storing the bookmark web addresses correspondingly to the user account, receiving a cloud scanning and killing instruction that includes the user account from the browser client, performing risk scanning and killing on the bookmark web addresses which the user account corresponds to, determining a risky web address, and feeds back a scanning and killing result that includes the risky web address to the browser client.

Optionally, the browser background server may include a synchronization unit and a safety detecting unit; the synchronization unit is used for receiving the synchronization request from the browser client, and storing the bookmark web addresses correspondingly to the user account; and the safety detecting unit is used for receiving the cloud scanning and killing instruction that includes the user account from the browser client, acquiring the bookmark web addresses which correspond to the user account from the synchronization unit, performing the risk scanning and killing on the bookmark web addresses, determining the risky web address, and feeding back the scanning and killing result that includes the risky web address to the browser client.

The security detecting unit may be arranged inside the browser background server, or may be arranged outside the browser background server separately.

Optionally, the browser client may be further used for deleting the risky web address from the bookmarks after receiving the scanning and killing result that includes the risky web address, and feeding back a response message that includes the user identification and the deleted web address to the synchronization unit, where the user identification may be the user account described above; and the synchronization unit may be further used for receiving the response message from the browser client, querying the bookmark web addresses that corresponds to the user identification, and deleting the web address included in the response message from the queried bookmark web addresses.

Optionally, the safety detecting unit may include a storage sub-unit and a scanning and killing sub-unit; the storage sub-unit is used for storing the list of risky web addresses; and the scanning and killing sub-unit is used for receiving the cloud scanning and killing instruction that includes the user account from the browser client, acquiring the bookmark web addresses that corresponds to the user account from the synchronization unit, judging whether at least one of the bookmark web addresses is included in the list of risky web addresses, determining the bookmark web address as the risky web address if it is included in the list of risky web addresses, and feeding back the scanning and killing result that includes the risky web address to the browser client.

Optionally, the storage sub-unit may be further used for storing a white list; the scanning and killing sub-unit may be further used for judging whether at least one of the bookmark web addresses acquired from the synchronization unit is included in the white list, determining the bookmark web addresses as a safe web addresses if it is included in the white list, and feeding back prompt information that includes the safe web address to the browser client; and the browser client may be further used for displaying the received prompt information.

Optionally, the browser client may be further used for adding a bookmark web address, and sending a synchronization addition request that includes the user account and the bookmark web address to the synchronization unit; and the synchronization unit may be further used for receiving the synchronization addition request from the browser client, storing the bookmark web address included in the synchronization addition request correspondingly to the user account, and sending the bookmark web address to the security detecting unit.

The foregoing descriptions are only preferred embodiments of the present invention, and not intended to limit the invention. Any changes, equivalent replacements, improvements, and so on made within the spirits and principles of the present invention should be included within the protection scope of the present invention.

What is claimed is:

1. A method for performing scanning and killing on browser bookmarks, comprising:
   receiving, by a browser background server, a synchronization request that includes a user account and bookmark web addresses from a browser client;
   storing, by the browser background server, the bookmark web addresses corresponding to the user account; and receiving a cloud scanning and killing instruction that includes the user account from the browser client, performing risk scanning and killing on the bookmark web addresses which the user account corresponds to, determining a risky web address, and feeding back a scanning and killing result that includes the risky web address to the browser client, by the browser background server; and wherein after feeding back the scanning and killing result that includes the risky web address to the browser client, the method further comprises:
  deleting, by the browser client, the risky web address from bookmarks stored on the browser client;
  feeding back, by the browser client, a response message that includes the user account and the deleted web address to the browser background server; and
  querying the bookmark web addresses that correspond to the user account, and deleting the web address included in the response message from the queried bookmark web addresses, by the browser background server.

2. The method according to claim 1, wherein after feeding back the scanning and killing result that includes the risky web address to the browser client, the method further comprises:
  in response to a response message that includes the user account and the risky web address deleted by the browser client, which is sent from the browser client, deleting, by the browser background server, the risky web address from the stored bookmark web addresses which correspond to the user account.

3. The method according to claim 1, wherein the preforming the risk scanning and killing on the bookmark web addresses includes:
  judging whether at least one bookmark web address in the bookmark web addresses is included in a list of risky web addresses, and if so, determining the at least one bookmark web address as the risky web address, by the browser background server.

4. The method according to claim 1, wherein the preforming the risk scanning and killing on the bookmark web addresses by the browser background server includes:
  judging whether at least one bookmark web address in the bookmark web addresses is included in a white list, and if so, determining the at least one bookmark web address as a safe web address, by the browser background server; and
  after preforming the risk scanning and killing on the bookmark web addresses by the browser background server, the method further comprises:
  feeding back, by the browser background server, prompt information that includes the safe web address to the browser client.

5. The method according to claim 1, wherein after sending, by the browser client, the synchronization request that includes the user account and the bookmark web addresses to the browser background server, the method further comprises:
  when the browser client adds a bookmark web address, sending, by the browser client, a synchronization addition request that includes the user account and the bookmark web address to the browser background server; and
  storing the bookmark web address included in the synchronization addition request correspondingly to the user account, and performing the risk scanning and killing on the bookmark web address, by the browser background server.

6. The method according to claim 1, wherein after sending, by the browser client, the synchronization request that includes the user account and the bookmark web addresses to the browser background server, the method further comprises:
  in response to a synchronization addition request that includes the user account and a bookmark web address added by the browser client, which is sent from the browser client, storing the bookmark web address included in the synchronization addition request correspondingly to the user account, and performing the risk scanning and killing on the bookmark web address, by the browser background server.

7. The method according to claim 1, wherein after sending, by the browser client, the synchronization request that includes the user account and the bookmark web addresses to the browser background server, the method further comprises:
  in response to a synchronization addition request that includes the user account and a bookmark web address added by the browser client, which is sent from the browser client, storing the bookmark web address included in the synchronization addition request correspondingly to the user account, and performing the risk scanning and killing on the bookmark web address, by the browser background server.

8. The method according to claim 2, wherein after sending, by the browser client, the synchronization request that includes the user account and the bookmark web addresses to the browser background server, the method further comprises:
  in response to a synchronization addition request that includes the user account and a bookmark web address added by the browser client, which is sent from the browser client, storing the bookmark web address included in the synchronization addition request correspondingly to the user account, and performing the risk scanning and killing on the bookmark web address, by the browser background server.

9. The method according to claim 3, wherein after sending, by the browser client, the synchronization request that includes the user account and the bookmark web addresses to the browser background server, the method further comprises:
  in response to a synchronization addition request that includes the user account and a bookmark web address added by the browser client, which is sent from the browser client, storing the bookmark web address included in the synchronization addition request correspondingly to the user account, and performing the risk scanning and killing on the bookmark web address included in the synchronization addition request, by the browser background server.

10. A system for performing scanning and killing on browser bookmarks, comprising:
  a browser client, residing on a terminal device, configured to send a synchronization request that includes a user account and bookmark web addresses to a browser background server, and receive a scanning and killing result that includes a risky web address from the browser background server; and
  the browser background server configured to receive the synchronization request from the browser client, store the bookmark web addresses correspondingly to the user account, receive a cloud scanning and killing instruction that includes the user account from the browser client, perform risk scanning and killing on the bookmark web addresses which the user account corresponds to, determine the risky web address, and feed back the scanning and killing result that includes the risky web address to the browser client;

wherein, the browser background server includes a synchronization unit, the synchronization unit is configured to receive the synchronization request from the browser client and store the bookmark addresses corresponding to the user account;

wherein the browser client is further configured to delete the risky web address from bookmarks stored on the browser client after receiving the scanning and killing result that includes the risky web address, and feed back a response message that includes the user account and the deleted web address to the synchronization unit; and wherein the synchronization unit is further configured to receive the response message from the browser client, query the bookmark web addresses that correspond to the user account, and delete the web address included in the response message from the queried bookmark web addresses.

11. The system according to claim 10, wherein the browser background server includes a safety detecting unit;

wherein, the safety detecting unit is configured to receive the cloud scanning and killing instruction that includes the user account from the browser client, acquire the bookmark web addresses which correspond to the user account from the synchronization unit, perform the risk scanning and killing on the bookmark web addresses, determine the risky web address, and feed back the scanning and killing result that includes the risky web address to the browser client.

12. The system according to claim 11, wherein
the synchronization unit is further configured to, in response to a response message that includes the user account and the risky web address deleted by the browser client, which is sent from the browser client, delete the risky web address from the stored bookmark web addresses which correspond to the user account.

13. The system according to claim 11, wherein the security detecting unit includes a storage sub-unit and a scanning and killing sub-unit;

the storage sub-unit is configured to store a list of risky web addresses; and the scanning and killing sub-unit is configured to receive the cloud scanning and killing instruction that includes the user account from the browser client, acquire the bookmark web addresses that correspond to the user account from the synchronization unit, judge whether at least one bookmark web address in the bookmark web addresses is included in the list of risky web addresses, determine the at least one bookmark web address as the risky web address if the at least one bookmark web address is included in the list of risky web addresses, and feed back the scanning and killing result that includes the risky web address to the browser client.

14. The system according to claim 13, wherein:
the storage sub-unit is further configured to store a white list;

the scanning and killing sub-unit is further configured to judge whether at least one bookmark web address in the bookmark web addresses acquired from the synchronization unit is included in the white list, determine the at least one bookmark web address as a safe web addresses if the at least one bookmark web address is included in the white list, and feed back prompt information that includes the safe web address to the browser client.

15. The system according to claim 11, wherein
the synchronization unit is further configured to, in response to a synchronization addition request that includes the user account and a bookmark web address added by the browser client, which is sent from the browser client, store the bookmark web address included in the synchronization addition request correspondingly to the user account, and perform the risk scanning and killing on the bookmark web address.

16. The system according to claim 11, wherein
the synchronization unit is further configured to, in response to a synchronization addition request that includes the user account and a bookmark web address added by the browser client, which is sent from the browser client, store the bookmark web address included in the synchronization addition request correspondingly to the user account, and perform the risk scanning and killing on the bookmark web address.

17. The system according to claim 11, wherein
the synchronization unit is further configured to, in response to a synchronization addition request that includes the user account and a bookmark web address added by the browser client, which is sent from the browser client, store the bookmark web address included in the synchronization addition request correspondingly to the user account, and perform the risk scanning and killing on the bookmark web address.

18. The system according to claim 12, wherein
the synchronization unit is further configured to, in response to a synchronization addition request that includes the user account and a bookmark web address added by the browser client, which is sent from the browser client, store the bookmark web address included in the synchronization addition request correspondingly to the user account, and perform the risk scanning and killing on the bookmark web address.

* * * * *